US010820047B2

(12) United States Patent
Hatambeiki et al.

(10) Patent No.: US 10,820,047 B2
(45) Date of Patent: Oct. 27, 2020

(54) SYSTEM AND METHOD FOR USER MONITORING AND INTENT DETERMINATION

(71) Applicant: UNIVERSAL ELECTRONICS INC., Santa Ana, CA (US)

(72) Inventors: Arsham Hatambeiki, Irvine, CA (US); Paul D. Arling, Irvine, CA (US)

(73) Assignee: Universal Electronics Inc., Santa Ana, CA (US)

( * ) Notice: Subject to any disclaimer, the term of this patent is extended or adjusted under 35 U.S.C. 154(b) by 0 days.

(21) Appl. No.: 14/461,928

(22) Filed: Aug. 18, 2014

(65) Prior Publication Data

US 2014/0366050 A1    Dec. 11, 2014

Related U.S. Application Data

(62) Division of application No. 13/758,307, filed on Feb. 4, 2013.

(51) Int. Cl.
| H04N 21/475 | (2011.01) |
| H04N 21/442 | (2011.01) |
| H04N 21/485 | (2011.01) |
| H04N 21/422 | (2011.01) |
| H04N 21/433 | (2011.01) |
| H04N 21/441 | (2011.01) |
| H04N 21/466 | (2011.01) |
| G06Q 30/02 | (2012.01) |

(52) U.S. Cl.
CPC ... *H04N 21/44204* (2013.01); *G06Q 30/0201* (2013.01); *H04N 21/42203* (2013.01); *H04N 21/4333* (2013.01); *H04N 21/441* (2013.01); *H04N 21/44218* (2013.01); *H04N 21/44222* (2013.01); *H04N 21/4667* (2013.01); *H04N 21/485* (2013.01); *H04N 21/4852* (2013.01)

(58) Field of Classification Search
USPC ..................................... 725/9, 10, 12, 14, 34
See application file for complete search history.

(56) References Cited

U.S. PATENT DOCUMENTS

| 4,931,865 | A | 6/1990 | Scarampi |
| 5,235,414 | A | 8/1993 | Cohen |
| 6,130,726 | A | 10/2000 | Darbee et al. |
| 7,346,512 | B2 | 3/2008 | Li-Chun Wang et al. |
| 7,627,477 | B2 | 12/2009 | Wang et al. |
| 7,986,913 | B2 | 7/2011 | Wang |

(Continued)

OTHER PUBLICATIONS

USPTO, Office Action issued on U.S. Appl. No. 13/925,966, dated Jan. 7, 2014, 19 pages.

(Continued)

*Primary Examiner* — Mulugeta Mengesha
*Assistant Examiner* — Charles N Hicks
(74) *Attorney, Agent, or Firm* — Greenberg Traurig, LLP

(57) ABSTRACT

Sensing interfaces associated with a home entertainment system are used to automate a system response to events which occur in a viewing area associated with the home entertainment system. Data derived from such sensing interfaces may also be used to enhance the response readiness of one or more system components. Still further, user presence data derived from such sensing interfaces may be used to capture and report user viewing habits and/or preferences.

13 Claims, 5 Drawing Sheets

(56) References Cited

U.S. PATENT DOCUMENTS

| | | |
|---|---|---|
| 2002/0059621 A1 | 5/2002 | Thomas et al. |
| 2002/0174426 A1 | 11/2002 | Gutta et al. |
| 2004/0003392 A1 | 1/2004 | Trajkovic et al. |
| 2005/0015816 A1 | 1/2005 | Christofalo et al. |
| 2005/0144632 A1 | 6/2005 | Mears et al. |
| 2005/0232210 A1* | 10/2005 | Karaoguz ......... H04L 29/06027 370/338 |
| 2007/0250864 A1* | 10/2007 | Diaz Perez ............ G06Q 30/02 725/52 |
| 2007/0271518 A1 | 11/2007 | Tischer et al. |
| 2008/0056222 A1* | 3/2008 | Waites ................. H04W 88/00 370/342 |
| 2009/0019394 A1* | 1/2009 | Sekimoto ........... H04N 5/44543 715/811 |
| 2009/0138805 A1 | 5/2009 | Hildreth |
| 2009/0205000 A1* | 8/2009 | Christensen ........... G11B 27/10 725/61 |
| 2009/0285545 A1 | 11/2009 | Bon |
| 2010/0315549 A1 | 12/2010 | Basso et al. |
| 2011/0093337 A1* | 4/2011 | Granit ................ G06Q 30/0251 705/14.53 |
| 2011/0292299 A1 | 12/2011 | Lau et al. |
| 2012/0060176 A1* | 3/2012 | Chai ....................... H04H 60/45 725/10 |
| 2012/0254907 A1 | 10/2012 | Serdiuk |
| 2013/0007808 A1 | 1/2013 | Ellis et al. |
| 2013/0036434 A1* | 2/2013 | Shkedi ............... H04N 21/4524 725/14 |
| 2013/0219417 A1 | 8/2013 | Gilson et al. |

OTHER PUBLICATIONS

ISA/US, International Search Report and Written Opinion issued on PCT Application No. US14/11573, dated May 13, 2014, 16 pages.

European Patent Office, Supplementary European Search Report issued on EP patent application No. 14746376, dated Feb. 5, 2016, 6 pages.

The International Bureau of WIPO, International Preliminary Report on Patentability of PCT Application No. US14/42687, dated Jan. 7, 2016, 8 pages.

SIPO, Office Action issued on Chinese patent application No. 201480047129.6, 11 pages.

European Patent Office, Office Action issued on EP patent application No. 14746376.4, dated Jun. 14, 2017, 5 pgs.

SIPO, Office Action issued on Chinese patent application No. 201480007203.1, 8 pages.

European Patent Office, Examination Report issued on European Patent Application No. 14746376.4, 5 pages.

Brazlian Patent Office, Office Action issued on Brazlian patent application No. BR112015017883-9, 2 pages.

* cited by examiner

SYSTEM AND METHOD FOR USER MONITORING AND INTENT DETERMINATION

RELATED APPLICATION INFORMATION

This application is a divisional of U.S. application Ser. No. 13/758,307, filed on Feb. 4, 2013, the disclosure of which is incorporated herein by reference in its entirety.

BACKGROUND

Home entertainment systems comprised of plural appliances and/or the controlling devices used to issue commands to such appliances may be provisioned with devices for detecting user presence and/or user interaction via methods such as gesture, spoken voice, facial recognition, spatial analysis, etc., as known in the art. Furthermore, growing use of personal communication devices such as smart phones, tablet computers, etc., may provide additional means for identification of user presence via detection of such personal communication devices on a local wireless network such as a WiFi network, a Bluetooth network, etc. While multiple media sources and multiple media rendering devices may be coupled in many of these home entertainment systems through a central routing appliance such as an AV receiver, set top box, smart TV, etc., no systems or methods currently exist for using user presence and/or user interaction detection alone or in conjunction with a central routing appliance to provide enhanced home entertainment system functionalities.

SUMMARY OF THE INVENTION

This invention relates generally to home entertainment systems and control methods therefor and, in particular, to enhanced functionalities for such home entertainment systems which are enabled by the availability of additional user-related input methods for such systems. For example, in one aspect of the invention sensing interfaces such as an image sensing interface (e.g., an interface associated with a camera), a sound sensing interface (e.g., an interface associated with microphone), and/or an interface for sensing the presence of an RF device such as a smart phone may be used to fully or partially automate a system response to common events which may occur during a TV viewing session, such as a user or users leaving or entering the viewing area, a user answering a telephone call, the detection of a doorbell ringing or a baby monitor alarm, etc. In another aspect of the invention, data derived from such sensing interfaces may be utilized to enhance the responsiveness of one or more system components, for example by sensing when a user is reaching for a physical remote control unit or preparing a component to issue a voice or gesture command. In a yet further aspect of the invention, user presence data derived from such sensing interfaces may be used by a central routing appliance in conjunction with media stream information in order to capture and report user viewing habits and/or preferences.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
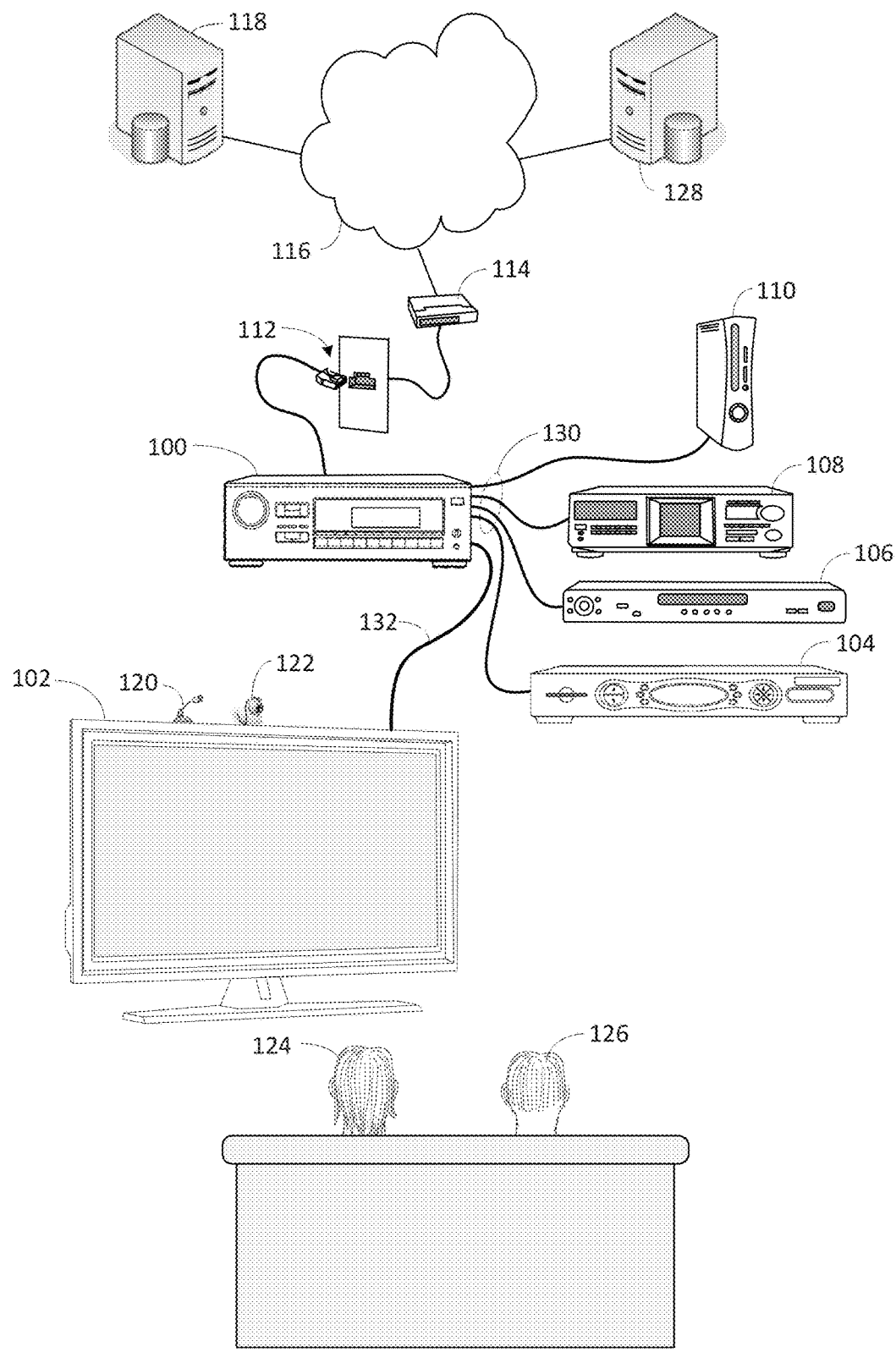
FIG. 1 illustrates an exemplary system in which the teachings of the subject invention may be utilized.

With reference to FIG. 1, an exemplary home entertainment system in which the methods of the subject invention may be applied may comprise an AV receiver 100 which serves as a hub for directing a selected video and/or audio media stream from a source appliance such as, for example, a satellite or cable system set top box and/or DVR device ("STB") 104, a DVD player 106, a CD player 108, or a game console 110 to a destination appliance, such as a TV set 102, where the selected video and/or audio media stream is to be rendered. In one preferred embodiment, the connections 130, 132 between appliances 102 through 110 and AV receiver 100 may generally comprise connections for carrying HDMI-compliant digital signals, although it will be appreciated that other interface standards such as component video, PCM audio, etc., may be substituted where necessitated by the limitations of a particular appliance. In some embodiments, additional AV content streams may also be available from a streaming service 118 such as for example Netflix, Vudu, YouTube, NBC online, etc., via a wide area network such as the Internet 116, to which end AV receiver 100 may be provisioned with a connection 112 to an Internet gateway device such as for example router 114. As will be appreciated, the connection between AV receiver 100 and Internet gateway device 114 may be wired as illustrated, or may be wireless, e.g., a WiFi local area network, as appropriate. To support audio and/or video phone calling, conferencing, etc. and in accordance with certain teachings of the subject invention, an exemplary home entertainment system may also be provisioned with one or more sensing interfaces, such as interfaces associated with microphone 120 and camera 122, suitable for the capture of audible and/or visible events within the home entertainment system environment. Users 124, 126 of the illustrative entertainment system may select the media stream currently being viewed by means of any convenient method such through use of a remote control as known in the art, a voice command, a gesture, etc. In some embodiments, data regarding these selections including without limitation media source, channel, track, title, etc., together with viewing duration, user presence, etc. may be accumulated and reported to a database server 128 for the aggregation and analysis of user viewing habits and preferences as discussed in greater detail below.

Figure 2:
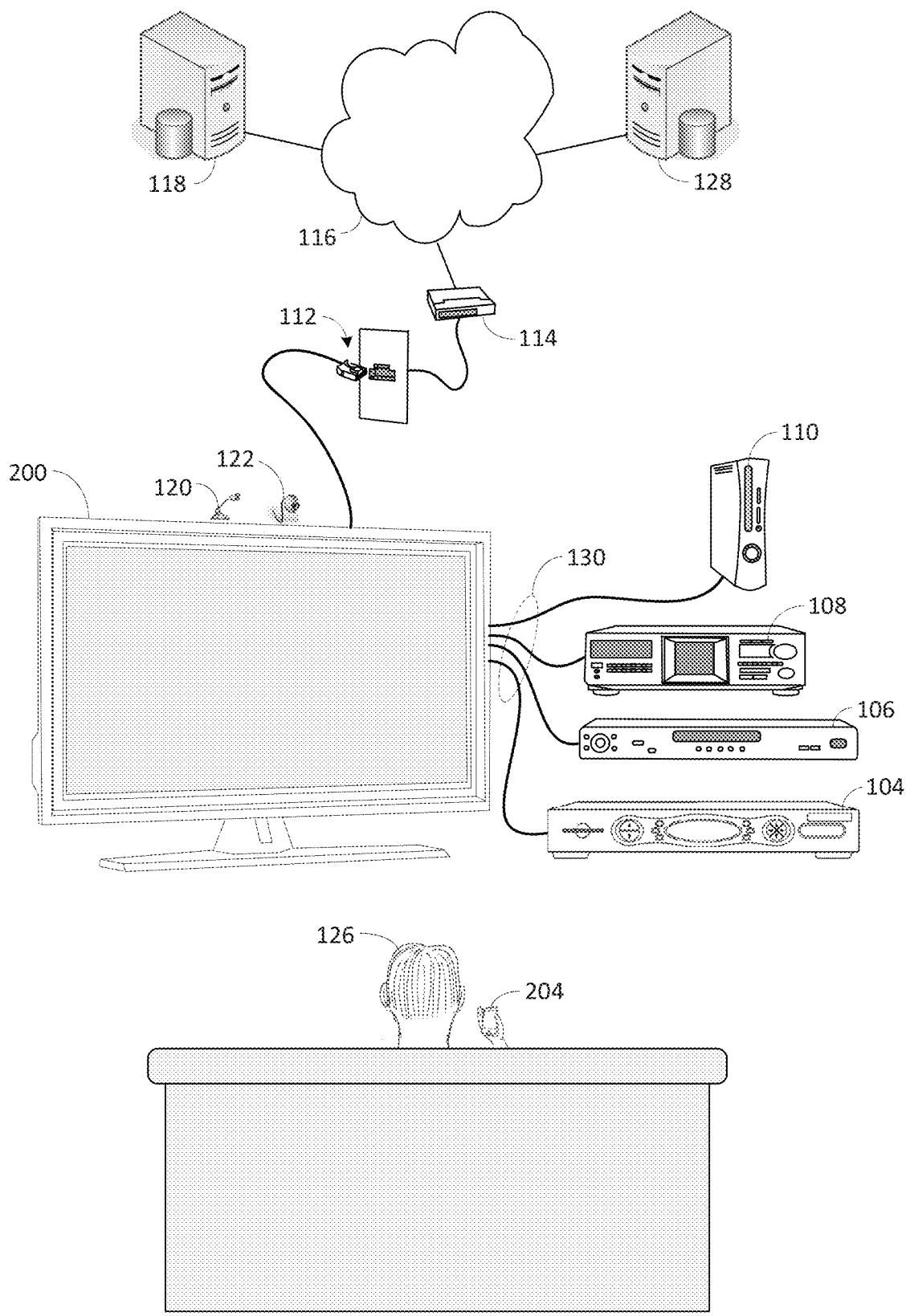
FIG. 2 illustrates a further exemplary system in which the teachings of the subject invention may be utilized.

Turning now to FIG. 2, in a second illustrative embodiment, a "smart" TV device 200 may incorporate both content rendering and source stream selection functionality. In this configuration, local appliances 104 through 110 may be connected directly to multiple input ports of TV 200 via, for example, HDMI connections 130. As is characteristic of the smart TV genre, TV 200 may also support a connection 112 to a wide area network such as the Internet 116 over which streaming AV content and other data may be received. The means for user command input to TV 200 and appliances 104 through 110 may take the form of a controlling device 204, for example a conventional remote control or a smart phone app in communication with the appliances via any convenient infrared (IR), radio frequency (RF), hardwired, point-to-point, or networked protocol, as necessary to cause the respective target appliances to perform the desired operational functions. Additionally, in certain embodiments user input may also comprise spoken and/or gestured commands in place of or supplemental to controlling device signals, which sounds and gestures may be received by microphone 120 and camera 122, processed and decoded by one of the appliances, for example TV 200, and where necessary relayed to other target appliances via, for example, HDMI CEC commands, IR or RF signals, etc., as described for example in co-pending U.S. patent application Ser. No. 13/657,176 "System and Method for Optimized Appliance Control," of common ownership and incorporated by reference herein in its entirety.

For brevity, the discussions which follow will generally be with reference to the exemplary equipment configuration of FIG. 2, it being understood however that in other embodiments, for example such that illustrated in FIG. 1, the steps of the methods presented herein may be performed, mutatis mutandis, by various appliances or combinations of appliances as appropriate for a particular equipment configuration.

Figure 3:
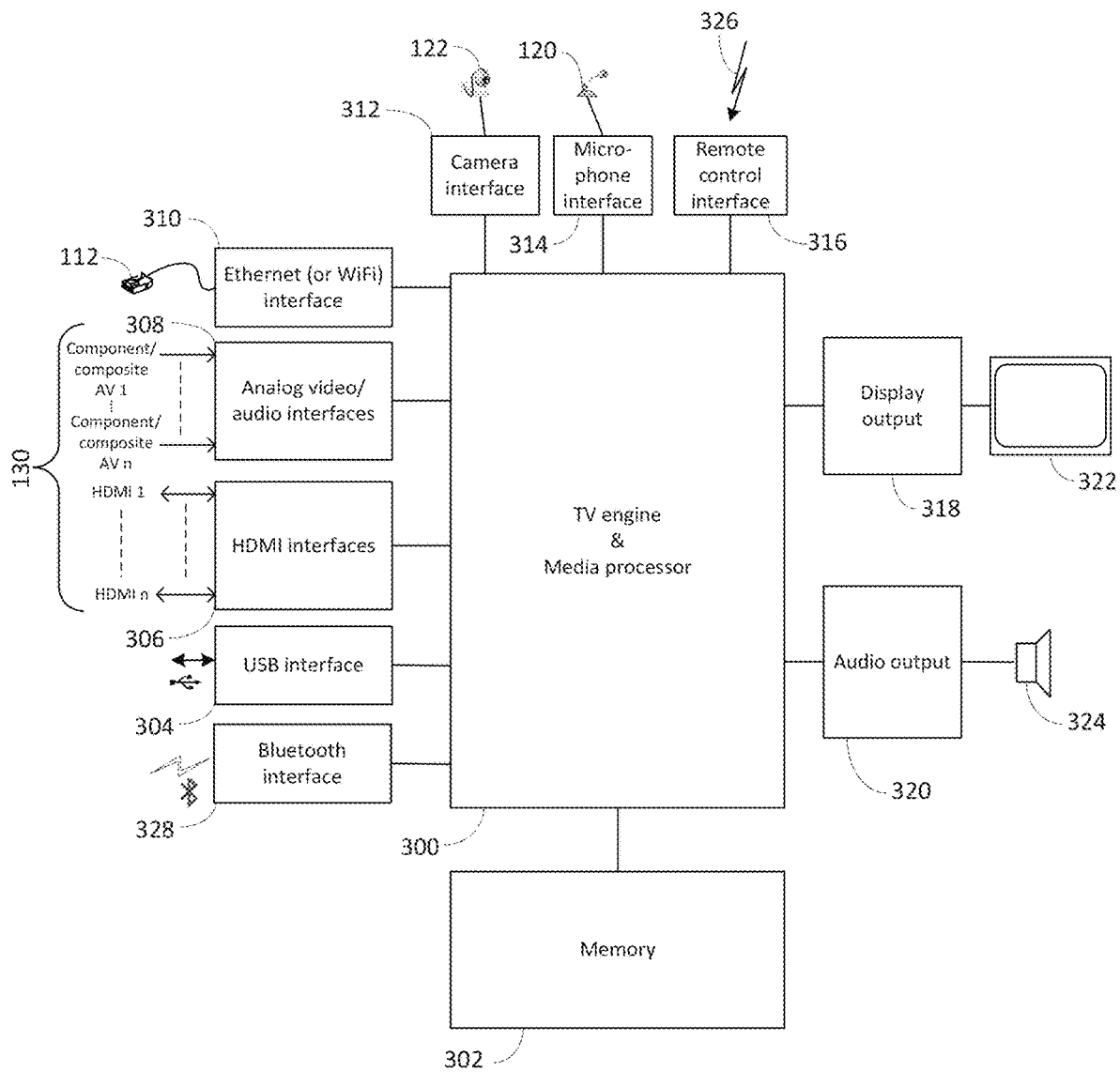
FIG. 3 illustrates, in block diagram form, an exemplary hardware architecture for an appliance which may be a component part of the systems illustrated in FIGS. 1 and 2.

As illustrated in FIG. 3, an exemplary central routing appliance, such as smart TV appliance 200, may include, as needed for a particular application, rendering capabilities, e.g., TV engine and media processor 300 (it being appreciated that this may comprise one or more than one physical processor depending on the particular embodiment); memory 302 which may comprise any type of readable or read/write media such as RAM, ROM, FLASH, EEPROM, hard disk, optical disk, etc., or a combination thereof; a USB interface 304; digital AV input ports and interface 306, for example DVI or HDMI; analog AV input ports and interface 308, for example composite or component video with associated analog audio; an Ethernet and/or WiFi interface 310; a Bluetooth interface 328; a digital camera interface 312 with associated camera 122 which may be externally connected or built into the cabinet of TV 200; a microphone interface 314 with associated microphone 120 which may be externally connected or built into the cabinet of TV 200; a remote control interface 316 for receiving user-initiated operational commands via IR or RF signals 326; a display output 318 connected to TV screen 322; and an audio output 320 connected to internal or external loudspeakers 324.

Figure 4:
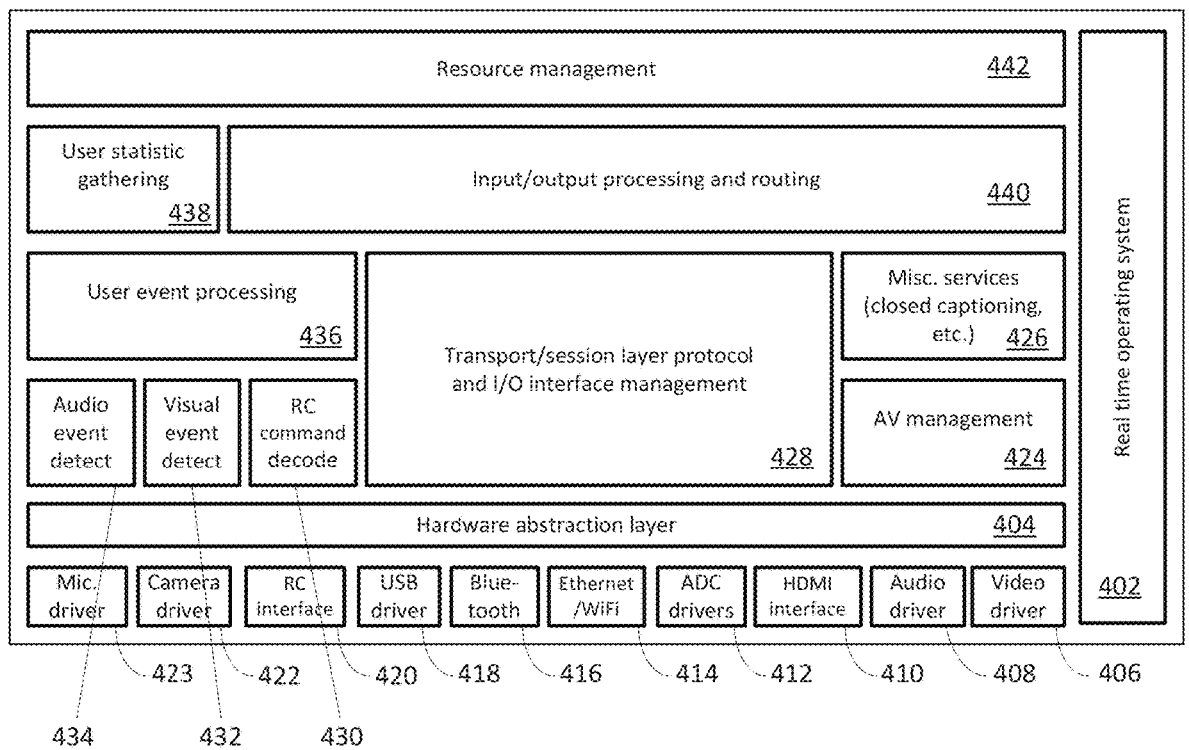
FIG. 4 illustrates, in block diagram form, an exemplary software architecture for the illustrative appliance of FIG. 3.

To cause the smart TV appliance 200 to perform an action, appropriate programming instructions may be stored within the memory 302 (hereafter the "TV programming") for execution by TV engine and media processor(s) 300. An exemplary architecture for such TV programming is presented in FIG. 4. As illustrated, the exemplary TV programming may include, as required for a particular application, an underlying operating system 402, such as for example LINUX, which may support a set of software modules implementing the various functionalities of the smart TV device. Such software modules may include a hardware abstraction layer 404 to provide a device independent interface between the various application software modules and the hardware dependent software modules such as video output driver 406, audio output driver 408, HDMI interface 410, analog input/output ADC/DAC 412, Ethernet and/or WiFi interface 414, Bluetooth interface 416; USB interface 418, remote control interface 420, and camera and microphone drivers 422 and 423. Exemplary application modules which reside above abstraction layer 404 may include as required for a particular embodiment transport and session layer protocol and interface management 428; AV output management 424; input/output processing and routing 440; a miscellaneous services module 426 to support closed captioning, display configuration, OSD, etc.; remote control command decoder 430; and device resource management 442. Additionally, in keeping with the teachings of this invention, the exemplary TV programming may include audio and visual event detector modules 432, 434, for example voice and/or image recognition engines or the like; user event processing 436; and a user statistics gathering and reporting module 438.

Figure 5:
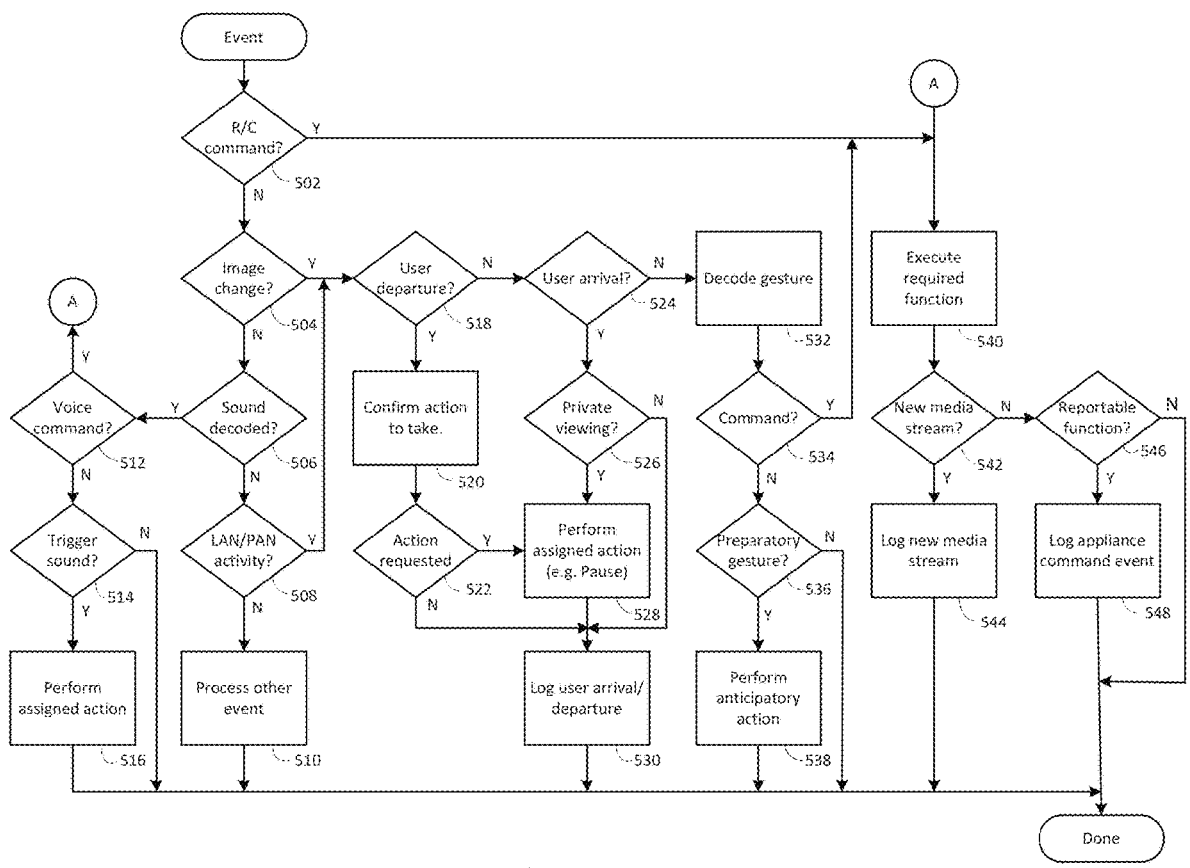
FIG. 5 illustrates, in flowchart form, the operation of an exemplary event processing module of the software architecture illustrated in FIG. 4.

Under the control of such TV programming, smart TV appliance 200 may for example receive an incoming AV media stream from one of the input ports 306,308 to be processed, buffered, separated into audio and video components, and routed to outputs 318, 320 for rendering on TV display screen 322 and loudspeaker(s) 324; may receive commands from remote control interface 316 which are decoded and acted upon, for example to select an input media stream, adjust audio volume, etc.; may manage a connection to the Internet through Ethernet or WiFi interface 310 to enable browsing for content, download of software updates, video telephony utilizing inputs from camera 122 and microphone 120; etc. Additionally, in accordance with the teachings herein, the exemplary TV programming may receive and process input signals from controlling device 204, camera 122 and/or microphone 120 in order to detect user presence, identify individual users, and/or receive user command input, as will described hereafter. As will be appreciated, while in the illustrative embodiment the source of audio input signals may comprise a microphone 120 and associated interface 314 provisioned as part of a smart TV appliance 200, in alternative embodiments audio input signals may be captured by any other appliance in the system and forwarded to appliance 200 for processing, or may originate from a microphone provisioned in a controlling device such as remote control or smartphone 204, the output of which microphone may, by way of example, be digitized and/or processed by controlling device 204 and wirelessly forwarded to smart TV appliance 200 via remote control interface 326, WiFi interface 310, Bluetooth interface 328, or any other means as appropriate for a particular implementation. In an exemplary embodiment the user event processing module 436 of the TV programming of TV appliance 200 (hereafter "event processing") may act as illustrated in the flowchart of FIG. 5 upon occurrence of a user-related event. First, at step 502 it may be determined if the event constitutes receipt of a remote control command, as may be reported by remote control command decoder 430. As will be appreciated, remote control commands may be received via any or all of RC interface 420 (e.g., infrared or RF4CE signals or the like), Ethernet/WiFi interface 414, or Bluetooth interface 416, depending on the particular embodiment and the particular controlling device currently in use. If it is determined that the event constitutes receipt of a remote control command, at step 540 the requested functional operation may be executed. By way of example without limitation, such operations may include adjustment of output audio volume to be performed by AV management module 424, selection of a new media input stream to be performed by I/O and routing module 440, etc. In some embodiments, received remote control commands may also comprise requests to direct the functional operation of other connected appliances, for example control of DVD player 106 or STB 104 via CEC commands to be issued by interface management module 428 over HDMI connections 130; or alternatively via a connected IR blaster or a LAN as described for example in co-pending U.S. patent application Ser. No. 13/657,176 "System and Method for Optimized Appliance Control," of common ownership and incorporated by reference herein in its entirety. Upon completion of the requested command function, at step 542 it may next be determined if the command function just performed comprised a change in the media stream being rendered by TV 200, for example selection of a new input port 306,308; a change to the selected broadcast channel or DVR playback of STB 104; a change to an internet media source, etc. If so, at step 544 data regarding this event may be conveyed to user statistics module 438 for logging and ultimate reporting to database server 128. As will be appreciated, the data logged regarding the new content stream may comprise some or all of the command parameters themselves, e.g., an STB channel number and timestamp; metadata items obtainable from the content source device or channel such as a DVD title, streaming video URL, etc.; a sample of the audio or video content itself for analysis as is known in the art and described, for example, in U.S. Pat. No. 7,986,913, 7,627,477 or 7,346,512; or any other data which may be suitable for identification purposes. If it is determined that the executed function did not comprise any change to the current media stream, at step 546 it may next be determined if the executed function comprised a reportable event, such as for example powering TV 200 (or any other connected device) on or off, issuing a fast forward command during DVR playback, etc. If so, this event may also be reported to user statistics module 438 for logging, after which processing of the remote control command is complete. In this regard, it will be appreciated that reportable appliance events such as powering an attached device on or off may also be separately initiated via for example direct communication to an appliance from its own remote control. Accordingly, though not illustrated, where such events are detectable, for example via HDMI status, absence or presence of video or audio signals, etc., these events may also be reported and logged.

If the reported event is not a remote control command, at step 504 the event processing may next determine if the reported event constitutes an image change event reported by visual event detection module 432 in response to analysis of image data received from camera 122 via camera driver 422. Such image processing may utilize for example the techniques described in U.S. Pat. Nos. 5,534,917, 6,829,384, 8,274,535, WIPO (PCT) patent application publication WO2010/057683A1, or the like, and may for example periodically monitor an image comprising the field of view of camera 122 in order in order to initiate image analysis in response to detection of any variation in image data which exceed a certain threshold value. If it is determined that the event is a report of a detected image change, at step 518 it is next determined if the event comprises the departure or imminent departure of a user from the viewing environment of TV 200. If so, various actions may be taken by event processing 436 as appropriate. By way of example, if the departing user is the sole viewer (or, in some embodiments, the primary user, i.e. the user who initiated the current viewing session) the event processing may be adapted to issue a "pause" command to the source of the current media stream. Other actions may include without limitation activating the recording function of a DVR, logging off a Web site, etc., as appropriate for a particular embodiment and configuration. If such an action is to be taken, at step 520 in the illustrative embodiment the event processing may cause display of a request for confirmation on TV screen 322, e.g. "Would you like to pause this show? (Y|N)." If confirmed by the user at step 522, which confirmation may take the form of a gesture, spoken command, remote control input, etc., or, in those embodiments where the default is to take action, a timeout, at step 528 the indicated action may be executed. In this context it will be appreciated that in embodiments where voice or gesture responses are expected, the performance accuracy of audio and/or visual event detection modules 432,434 may be improved by indicating a range of possible responses (e.g., "yes" or "no" in this instance) to these modules in advance, thereby limiting the number of sound or gesture templates which need to be matched. Also, in some embodiments where voice input may be utilized, the sound level of TV audio output 320 may be temporarily lowered to reduce background noise. Thereafter, at step 530 data regarding the change in user, including user identity where this is determinable, for example via use of techniques such as described in U.S. Pat. Nos. 7,551,756, 7,702,599, or the like, may be conveyed to statistic gathering module 438 for logging, after which processing is complete.

If the detected image change event is not a user departure, at step 524 the event processor may next determine if the reported event comprises the arrival of a new or additional user in the TV viewing environment and if so take appropriate action. By way of example, some embodiments may be adapted to allow a viewer to invoke a "private viewing" status which may cause the current content to be automatically muted, paused, switched, etc. in the event an additional user enters the viewing environment. In such embodiments, at step 526 it may be determined if such a status currently exists. If so at step 528 the appropriate action may be executed, after which data regarding the user arrival, including user identity where this is determinable, may be conveyed to statistic gathering module 438 for logging, and event processing is complete. By way of further example without limitation, re-entry of a user into a viewing environment may trigger an offer to resume playback of previously paused content; or in a multi-room, multi-device household in which appliances are networked together and equipped with viewer recognition, the entry of a user into one viewing environment may cause the event processor in that environment to query other event processors and/or statistic modules elsewhere in the household to determine if that user has recently departed another environment, and if so, offer to resume playback of a content stream which was previously paused in that other environment.

If the detected image change event is not a user arrival or departure, at steps 532, 534 and 536 it may next be determined if the reported event comprises a detectable gesture, a detectable gesture in this context comprising a user action or motion which either by pre-programming or a learning process has been identified to visual event detection module 432 as having significance as user input. If the reported event is determined to be associated with an operational command function, for example "pause", "mute", "channel up", etc., processing may continue at step 540 to execute the command as described previously. If the reported event is determined to be a preparatory gesture, appropriate anticipatory action may be taken at step 538. In this context, a preparatory gesture may comprise without limitation any preliminary motion or gesture by a user which may be interpreted as a possible indication of that user's intent to perform an action, for example standing up, reaching for or setting down a remote control device, beckoning an out of sight person to enter the room, picking up a phone, etc. Anticipatory actions may include for example pre-conditioning visual and/or audio detection modules 432,434 to favor certain subsets of templates for matching purposes; modifying an on-screen menu from a format optimized for gesture control to one optimized for navigation via a keyboarded device such as a remote control, or vice-versa; reducing or muting audio volume; signaling a remote control device exit a quiescent state, to turn on or shut off its backlight, or the like; etc.

If the reported event is not an image change event, at step 506 the event processing may next determine if the reported event constitutes a sound recognition event reported by audio event detection module 434. Speech or sound recognition by module 434 may utilize for example the techniques described in U.S. Pat. No. 7,603,276, WIPO (PCT) patent application publication WO2002/054382A1, or the like. If the event is a sound recognition event, at step 512 it may be determined if the decoded sound constitutes a voice command issued by a user. If so processing may continue at step 540 to execute the desired command as described previously. If not a voice command, at step 514 it may be determined if the reported event constitutes a trigger sound. In this context a trigger sound may be an instance of a non-vocal audio signal received via microphone 120 which either by pre-programming or via a learning process has been assigned a command or an anticipatory action. By way of example without limitation, trigger sounds may include a phone or doorbell ringing, a baby monitor, smoke alarm, microwave chime, etc. If the reported sound event is a trigger sound, the appropriate action, such as muting the television, etc., may be taken at step 516. The system can be also be programmed to recognize various sounds and or spoken words/phrases as being indicative of a preparatory event whereupon one or more of the system components will be readied via an anticipatory action as described above. By way of example, a spoken phrase such as "let's see what else is on" may be recognized as a preparatory event whereupon an anticipatory action may be executed to place a remote control device into a state wherein the remote control device is readied to receive input in anticipation of its use or a spoken phrase such as "come here," the sound of a door bell, or the like may be recognized as a preparatory event whereupon an anticipatory action may be executed to ready the system to look for an anticipated event, e.g., a specific gesture, such as a user standing up, leaving the viewing area, etc. whereupon the appropriate response action to the sensed event that was anticipated, e.g., pausing the media, may be performed.

In the event that an anticipated event is not performed within a predetermined period of time, the system may execute, as needed, further actions, such as restorative action, to place the system into a state as desired, e.g., to return one or more components of the home entertainment system to a state where the component(s) is no longer looking for the occurrence of the anticipation event.

If the reported event is not a sound recognition event, at step 508 the event processing may next determine if the reported event comprises a wireless device such as for example a smart phone, tablet computer, game controller, etc., joining into or dropping from a LAN or PAN associated with smart TV 200 or other appliance in the system. If such devices have been previously registered with the TV programming, such activity may be used to infer the presence or absence of particular users. Such information may then be processed in a similar manner to user image detection (e.g., processed as a user being added or departing) continuing at step 518 as previously described.

Finally, at step 510 the event processor may process any other event report activity as consistent with a particular embodiment. For example, in some embodiments users may be provisioned with personal remote control devices which embed user identification data in their command transmissions, such as described in co-pending U.S. patent application Ser. No. 13/225,635 "Controlling Devices Used to Provide an Adaptive User Interface," of common ownership and incorporated by reference herein in its entirety, in which case user presence reporting events may be generated by remote control interface 420. In other embodiments technologies such as infrared body heat sensing such as proposed in the art for use in automatic unattended power-off applications may be further adapted for the purposes described herein. Additional sources of activity events may also include data received from other household equipment such as security, lighting, or HVAC control systems equipped with occupancy sensors; entryway cameras; driveway sensors, etc., where appropriate.

Statistic gathering module 438 may be adapted to report the data conveyed to it during the event processing steps described above to a centralized service, e.g., hosted on Internet connected server device 128, for aggregation and analysis of user viewing habits and preferences. Depending on the particular embodiment such reporting may be performed on an event-by-event basis, or alternatively the data may be accumulated and reported at predetermined time intervals or only upon receipt of a request from the server device.

By way of example, in an illustrative embodiment data reported to statistic gathering module 438 may be formatted into several different event record classes and types for uploading to server device 128. Exemplary record classes may comprise user events, e.g., as may be reported at step 530 of FIG. 5; appliance events, e.g., as may be reported at step 548 of FIG. 5; and content events, e.g., as may be reported at step 544 of FIG. 5. As will be appreciated, different or additional event classes may be appropriate in alternate embodiments and accordingly the above classifications are presented by way of example only and without limitation.

With reference to Table 1 below, user event record types may include addition (i.e., arrival) of user to the viewing area and deletion (i.e., departure) of a user from the viewing area. As illustrated, each of these record types may include timestamp data and a user ID. The timestamp illustrated is suitable for use in applications where the server device is already aware of the geographical location of the reporting system, e.g., as a result of an initial setup procedure, by URL decoding, etc. In embodiments where this is not the case, the timestamp field may include additional data such as a time zone, zip code, etc., where required. User identity may be any item of data which serves to uniquely identify individual users to facilitate viewing habit and preference analysis at server 128. By way of example, user ID data may comprise identities explicitly assigned during a setup/configuration process; random numbers assigned by the system as each distinct user is initially detected; a hash value generated by a facial or voice recognition algorithm; a MAC address or serial number assigned to a smart phone or tablet computer; etc. as appropriate for a particular embodiment.

TABLE 1

User event record

| Event type | Time stamp | User ID |
|---|---|---|
| User:add | yyyy:mm:dd:hh:mm:ss | xxxxxxxx |
| User:delete | yyyy:mm:dd:hh:mm:ss | xxxxxxxx |

Referring now to Table 2, appliance event records may comprise record types indicative of events reported to, functional commands issued to, and/or operations performed by various controlled appliances, e.g., as reported at step 548 of FIG. 5. Such events may include without limitation appliance power on/off commands, playback control commands, etc., as necessary for a complete understanding of user viewing habits and preferences. By way of example, in addition to capturing power status for a DVR appliance, fast forward commands may also be logged in order to monitor commercial skipping activity. As illustrated, each appliance event record type may also include a timestamp field as described above and an appliance type/ID field comprising an appliance type indicator (e.g. STB/DVR, DVD, Internet stream, etc.) together with a unique ID or subtype value which may be assigned by the event monitoring and/or statistics gathering module in order to distinguish between multiple appliances of the same type, e.g., a household with multiple DVD players, or with both cable and satellite STBs.

TABLE 2

Appliance event record

| Event type | Time stamp | Appliance type/ID |
|---|---|---|
| Appliance:on | yyyy:mm:dd:hh:mm:ss | tt:xxxx |
| Appliance:off | yyyy:mm:dd:hh:mm:ss | tt:xxxxx |
| Appliance:play | yyyy:mm:dd:hh:mm:ss | tt:xxxxx |
| Appliance:stop | yyyy:mm:dd:hh:mm:ss | tt:xxxxx |
| Appliance:pause | yyyy:mm:dd:hh:mm:ss | tt:xxxxx |
| Appliance:ffwd | yyyy:mm:dd:hh:mm:ss | tt:xxxxx |
| Etc . . . | | |

Referring now to Table 3, content event record types may include without limitation a channel or track change information record type; a title information record type containing, for example, a show title retrieved from program guide data, DVD or video-on-demand title information, etc.; a metadata record type containing metadata values obtained from a DVD or CD, streaming video service, or the like; a content sample record type containing a sample clip of audio and/or video content for comparison against a content identification database; or in alternate embodiments any other data which may be utilized in determining the identity of a particular content stream. Each record type may comprise timestamp and source appliance fields as described above, together with a field containing identity data, which may comprise numeric, text, or binary data as necessary. As will be appreciated, additional record and/or field types may be utilized in other embodiments, as necessary to enable reliable identification of media content streams.

TABLE 3

Content event record

| Event type | Time stamp | Source appliance | Identity data |
|---|---|---|---|
| Content:chan/track | yyyy:mm:dd:hh:mm:ss | tt:xxxx | xxxxx |

TABLE 3-continued

Content event record

| Event type | Time stamp | Source appliance | Identity data |
|---|---|---|---|
| Content:title | yyyy:mm:dd:hh:mm:ss | tt:xxxx | {text} |
| Content:metadata | yyyy:mm:dd:hh:mm:ss | tt:xxxx | {text} |
| Content:sample | yyyy:mm:dd:hh:mm:ss | tt:xxxx | {binary data} |
| Etc . . . | | | |

It will be appreciated that while the exemplary data structures of Tables 1 through 3 are presented herein using a tabular format for ease of reference, in practice these may be implemented in various forms using any convenient data representation, for example a structured database, XML file, cloud-based service, etc., as appropriate for a particular embodiment. Furthermore, it will also be appreciated that while the statistics gathering and recording functionality of the illustrative embodiment is implemented as part of the programming of an exemplary appliance 200, i.e., in software module 438, in other embodiments this functionality may be provisioned at a different location, for example in one of the other appliances forming part of an entertainment system, in a local PC, at a remote server or cable system headend, etc., or at any other convenient location to which the particular appliance programming may be capable of reporting user events.

While various concepts have been described in detail, it will be appreciated by those skilled in the art that various modifications and alternatives to those concepts could be developed in light of the overall teachings of the disclosure. For example, in alternate embodiments the steps of the methods described above may be advantageously performed in various other appliances as appropriate, e.g. an AV receiver or a cable/satellite STB. Further, in an interconnected system such as illustrated in FIG. 1 or 2, especially where such interconnection is digital, it will be appreciated that the various steps of the methods may be performed by different appliances. For example without limitation, image analysis and/or speech recognition may be performed by a smart TV device, a locally connected personal computer, a home security system, etc., or even "in the cloud", i.e., by an Internet based service, with the results reported to a user statistic gathering module and/or an event processing module resident in a connected AV receiver or STB.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A method for collecting information indicative of usage of at least one component device in a home entertainment system comprised of a plurality of component devices, comprising:

capturing via a wireless, networked device interface associated with the home entertainment system from a number of wireless, network capable devices user event data wherein the user event data captured via the wireless, networked device sensing interface comprises data is indicative of a change in the number of wireless, network capable devices determined to be communicatively coupled to the wireless, networked device interface;

capturing via the wireless, networked device interface associated with the home entertainment system from at least a one of the number of wireless, network capable devices appliance event data;

capturing via at least one of the plurality of component devices in the home entertainment system content event data;

formatting the captured user event data, the captured appliance event data, and the captured content event data into a respective one of a user event record class, an appliance event record class, and a content event record class; and providing one or more advertisement or content dissemination services access to information contained within the user event record class, the appliance event record class, and the content event record class to allow for an analysis of user viewing habits and preferences;

wherein the appliance event data comprises data indicative of a wireless command being provided to at least one of the plurality of component device from the at least one of the number of wireless, network capable device communicatively coupled to the wireless, networked device interface and wherein the wireless command comprises a command to change a state of the at least one of the plurality of component devices in the home entertainment system.

2. The method as recited in claim 1, wherein the content event data comprises data indicative of at least one of a show title retrieved from a program guide, a DVD, and a streamed video.

3. The method as recited in claim 1, wherein the content event data comprises data indicative of a media sample extracted from a video and/or an audio being rendered by at least one of the plurality of component devices.

4. The method as recited in claim 1, wherein the content event data comprises a metadata value obtained from at least one of a DVD, a CD, and a streaming video service.

5. The method as recited in claim 1, wherein an entry in the user event record comprises a user identifier, a time stamp, and a one of a plurality of user event type identifiers.

6. The method as recited in claim 1, wherein an entry in the appliance event record comprises a component device identifier, a time stamp, and a one of a plurality of appliance event type identifiers.

7. The method as recited in claim 1, wherein an entry in the content event record comprises a source component device identifier, a time stamp, a one of a plurality of content event type identifiers, and identity data corresponding to the one of the plurality of content event type identifiers.

8. The method as recited in claim 1, comprising using an radio frequency communication protocol to communicatively couple the number of wireless, network capable device with the wireless, networked device interface.

9. The method as recited in claim 8, wherein the radio frequency communication protocol comprises a WiFi communication protocol.

10. The method as recited in claim 8, wherein the radio frequency communication protocol comprises a Bluetooth communication protocol.

11. The method as recited in claim 8, comprising receiving registration data from the number of wireless, network capable device and using the MAC address received from the number of wireless, network capable device to determine if the number of wireless, network capable devices communicatively coupled to the wireless networked device interface has changed.

12. The method as recited in claim 11, wherein the registration data comprises a MAC address assigned to each of the number of wireless, network capable device.

13. The method as recited in claim 11, wherein the registration data comprises a number assigned to each of the number of wireless, network capable device during a registration process performed with the wireless, networked device interface.

\* \* \* \* \*